United States Patent
Balch

[11] 3,781,785
[45] Dec. 25, 1973

[54] COLOR SONAGRAMS AND METHODS FOR THEIR PRODUCTION

[75] Inventor: Alfred H. Balch, Littleton, Colo.

[73] Assignee: Marathon Oil Company, Findlay, Ohio

[22] Filed: Jan. 26, 1970

[21] Appl. No.: 5,830

[52] U.S. Cl. .................... 340/15.5 DS, 250/219 IA
[51] Int. Cl. ............................................. G01v 1/34
[58] Field of Search ....................... 340/15.5 DS; 250/219 IA

[56] References Cited
UNITED STATES PATENTS

| | | | |
|---|---|---|---|
| 3,602,979 | 3/1971 | McLean | 343/5 CD |
| 2,901,747 | 8/1959 | Sunstein | 343/5 CD |
| 3,209,320 | 9/1965 | Barthman | 250/219 UX |
| 2,993,416 | 7/1961 | Loper | 340/15.5 DS |
| 2,944,620 | 7/1960 | Van Dyck | 340/15.5 |
| 3,072,907 | 1/1963 | Boucher | 340/15.5 |

Primary Examiner—Benjamin A. Borchelt
Assistant Examiner—N. Moskowitz
Attorney—Joseph C. Herring, Richard C. Willson, Jr. and Jack L. Hummel

[57] ABSTRACT

Seismographic signals are separated by filters into their low-, medium-, and high-frequency component signals and the envelope of each is generated and displayed in a different color, e.g., red, green, and blue, respectively. The displays are superimposed, and combined with the seismic trace so as to show both frequency content and time varying amplitude simultaneously.

17 Claims, 8 Drawing Figures

INVENTOR
ALFRED H BALCH
BY

ATTORNEY

INVENTOR
ALFRED H. BALCH
BY

ATTORNEY

Fig. 4d

"Yellow"

INVENTOR
ALFRED H. BALCH

ATTORNEY

INVENTOR
ALFRED H. BALCH
BY

ATTORNEY

COLOR SONAGRAMS AND METHODS FOR THEIR PRODUCTION

BACKGROUND OF THE INVENTION

1. Field of the Invention:

The present invention relates generally to processes for recording and displaying electrical signals particularly those derived from earth-controlled transient events, e.g., seismic signals, generally classified in subclass 346-1.

2. Description of the Prior Art

Various methods of "color mimicry" have been utilized to display aspects of electrical signals by color representation. Such methods include U. S. Pat. No. 3,363,258, which utilizes mirror galvanometers to form images which vary in intensity according to the amplitude of the signal and combines such optical signals onto the surface of color film; U. S. Pat. No. 2,230,541 which records phase information of a seismic signal by use of mirror galvanometers and photosensitive transducers; U. S. Pat. No. 3,072,907 which uses color to display the frequency of "zero crossings" of seismic signals by projecting varying colors on a drum of photographic film; U. S. Pat. No. 2,944,620 which produces variable area seismograms in which color indicates frequency; U. S. Pat. No. 3,143,189 which produces seismograph traces in which the color at a given point on the traces is indicative of the signal's amplitude by use of reflecting galvanometers projecting through color transparencies; U. S. Pat. No. 3,193,832 which uses color to represent half-cycle breadth (an approximation of frequency) by means of rotating mirror galvanometers which reflect portions of a color scale onto a rotating color film drum; U. S. Pat. No. 3,281,852 which utilizes a color mask in conjunction with color sensitive photographic film moving on a rotating drum; and U. S. Pat. No. 3,050,731 which utilizes film to record separately the outputs from a low pass and a high pass filter and then combines these films onto a single color film. Various methods of separating transient electrical signals into various frequency components have been utilized by some of the above-mentioned U. S. patents and also by U. S. Pat. No. 2,951,736.

SUMMARY

1. General Statement of the Invention

According to the present invention, electrical signals, e.g., digitized, recorded seismic signals, are filtered into frequency component signals, each of which is then preferably demodulated to form the envelope of the component signal and each of the demodulated signals is then preferably converted into a series of visible lines having excursions, with the frequency of such excursions being proportional to the amplitude of the demodulated (envelope) signal. The invention then preferably produces a differently colored replica of each of the series of visible lines and combines them to form a single display indicative of the frequency component distribution of the original signal. In an especially preferred embodiment, the original signal itself may be visibly displayed e.g., as a black and white transparency and combined with the colored line signals to form a single display which contains all of the colored indications of frequency component distribution, averaged over a small, moving time window, together with a visible representation of the original signal. This permits an extremely intensive display of the relevant data, e.g., for use in mineral exploration. This combining of the original signal is made possible by the use of "envelopes" and/or the use of colored lines with excursions. Past methods which have utilized broad bands which varied in color according to the frequency (or amplitude) of the signal have tended to have an obscuring, or smearing, effect which made it difficult or impossible to combine these representations with the original signal due to loss of time resolution of the original signal and to other factors.

2. Utility of the Invention

The invention is useful for a wide variety of display of signals, particularly earth-controlled transient event-type signals such as those produced by seismography, well bore acoustical logging, borehole echo ranging, resistivity measurements and the like.

BRIEF DESCRIPTION OF THE DRAWINGS

FIG. 4d is a (yellow) photographic reproduction of the high frequency component of the signal of FIG. 4a after it has been processed according to the invention.

DESCRIPTION OF THE PREFERRED EMBODIMENT

1. Apparatus

Figure 1:
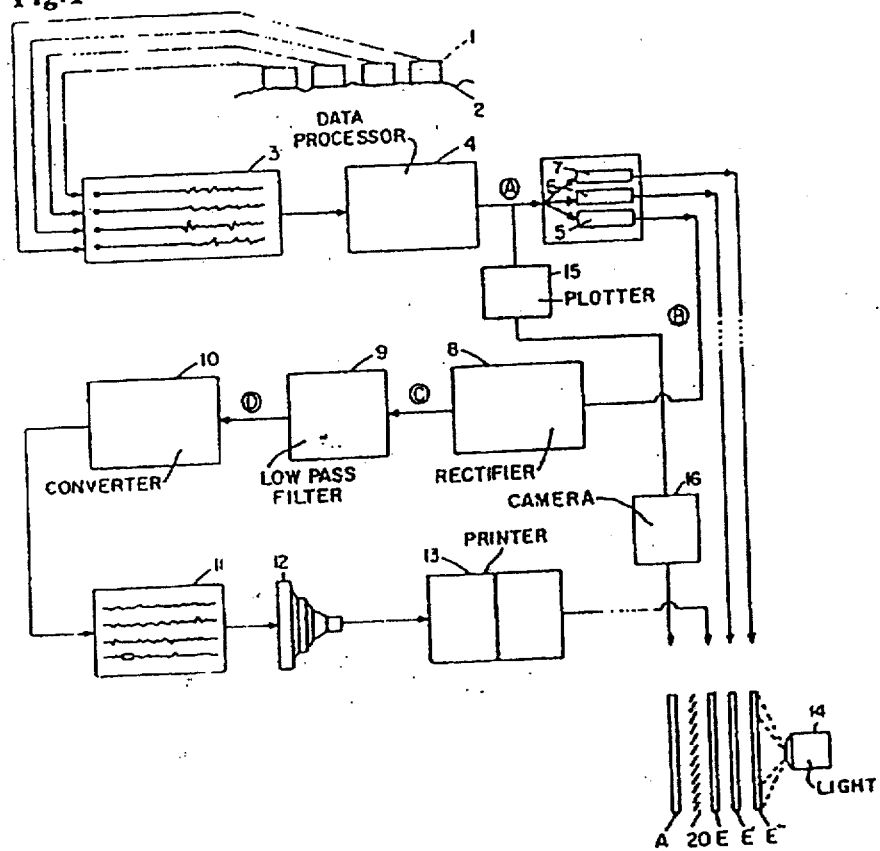
FIG. 1 is a schematic representation of preferred apparatus for processing of signals according to the invention.

Referring to FIG. 1, the apparatus of the preferred embodiment is described below:

Geophones 1 detect earth motions caused by a shock administered to the earth 2 at a distant point. Many other sensing elements for detecting earth-controlled events could be utilized in place of geophones, e.g., radiation or acoustic logging devices, resistivity electrodes for electrical prospecting, precession magnatometers for detecting changes in the magnetic field, or the conventional devices.

Recorder 3 records the outputs from the geophones. Although the recorder is shown as a multichannel strip chart recorder, it will be even more preferable to utilize a magnetic tape recorder which can record either an analogue (substantially continuous) signal or a digital (discretely sampled) signal.

Data processor 4 is a computer programmed to apply static and dynamic time corrections to the recorded signals, band-pass filter for the purpose of removing noise, deconvolve the data, "stack" the signals from the individual sets of geophones by aligning and compositing them and thus enhance particular earth-controlled events. Obviously, some of these operations can be performed manually but conventional computer geophysical data processing will be preferred.

Figure 2:
FIG. 2 is a representation of a portion of a filtered signal showing the effect of full wave rectification (or plotting of "absolute value") of the signal.
Figure 4A:
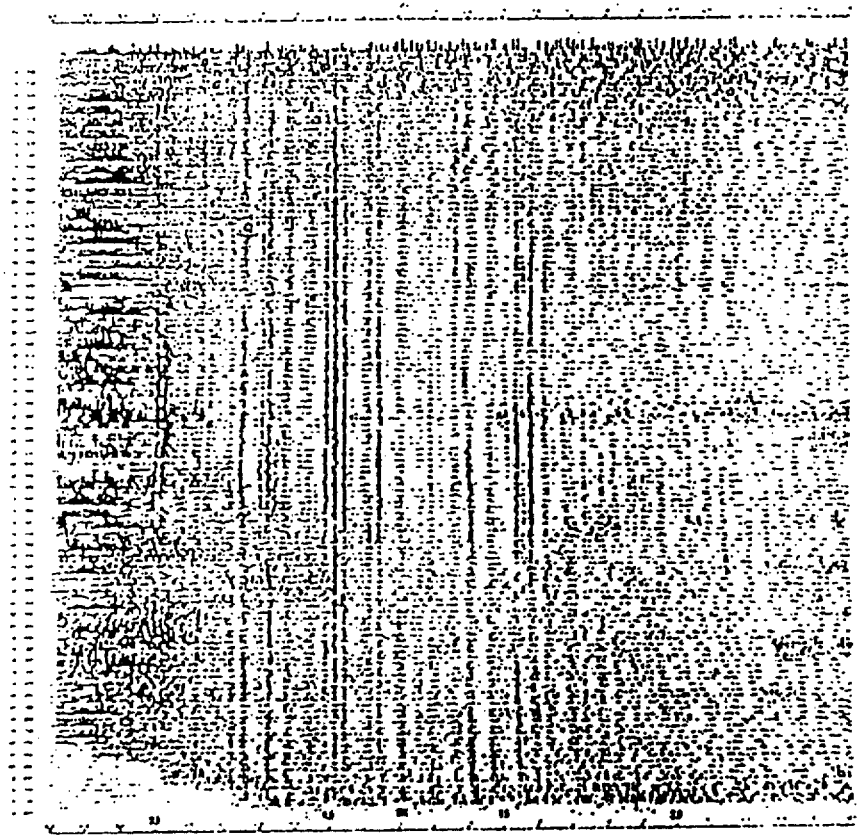
FIG. 4a is a (black and white) photographic reproduction of an ensemble of original seismic signals after typical conventional geophysical data processing, including "stacking."
Figure 4B:
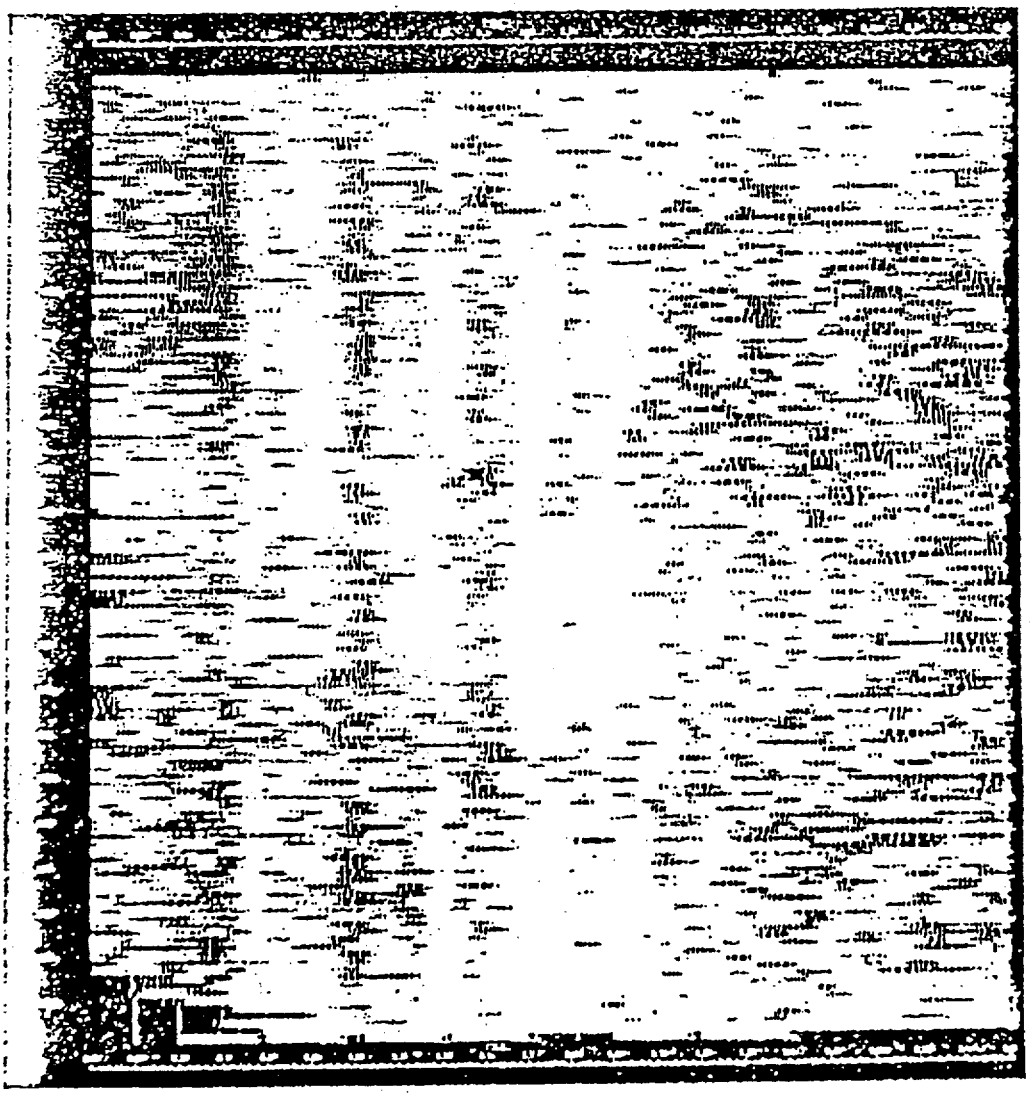
FIG. 4b is a (cyan) photographic reproduction of the low frequency component of the signal of FIG. 4a after it has been processed according to the invention.
Figure 4C:
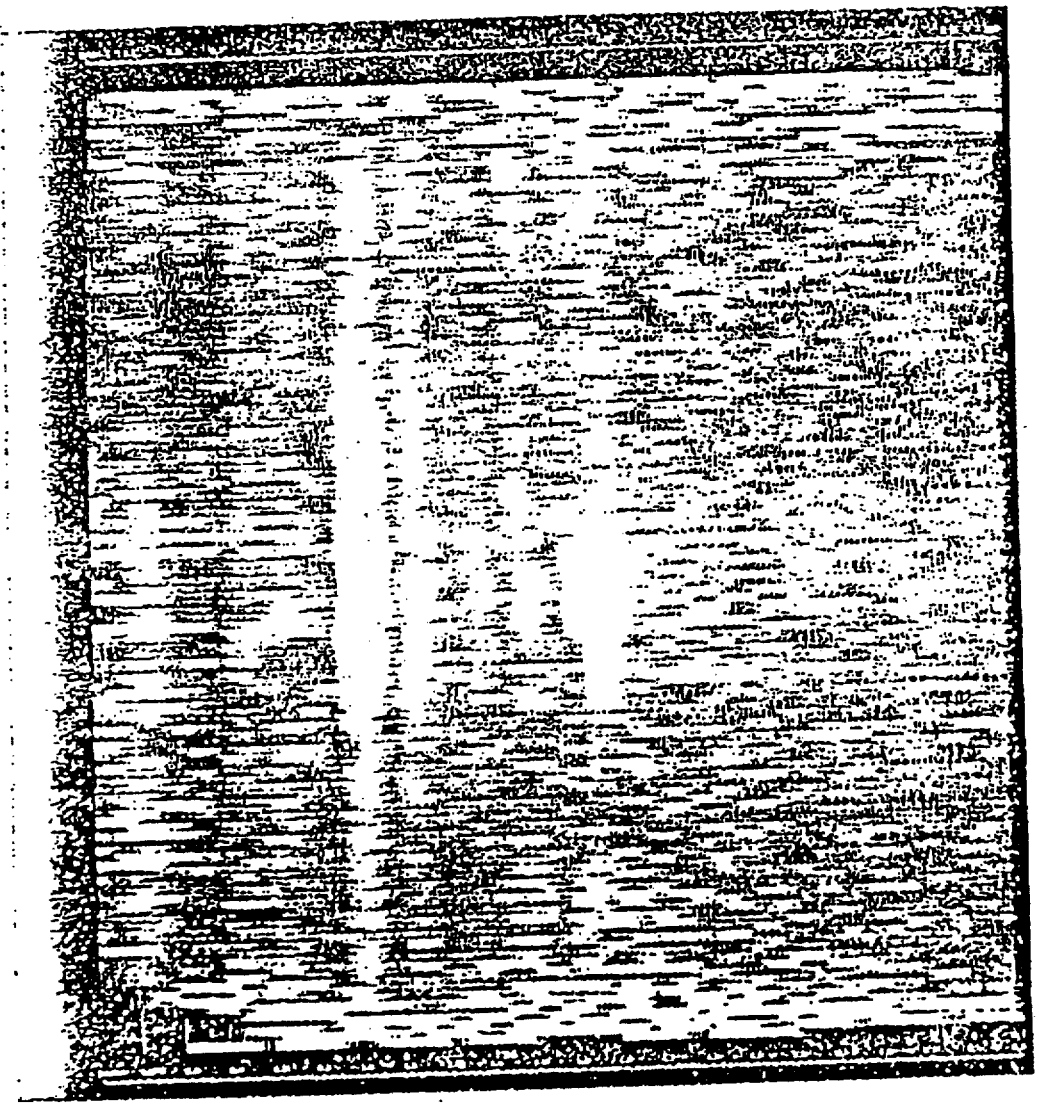
FIG. 4c is a (magenta) photographic reproduction of the medium frequency component of the signal of FIG. 4a after it has been processed according to the invention.
Figure 4D:
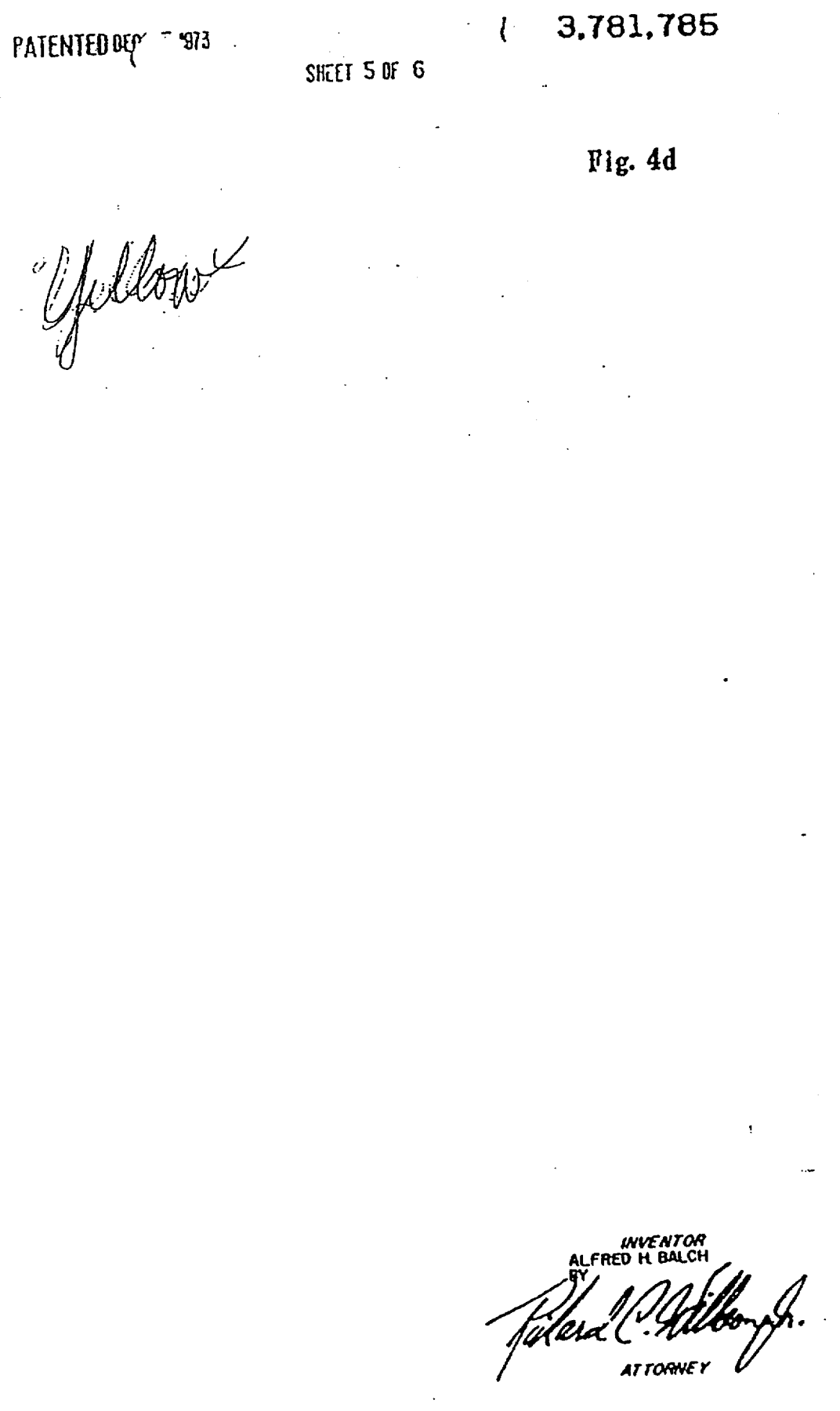
Figure 4E:
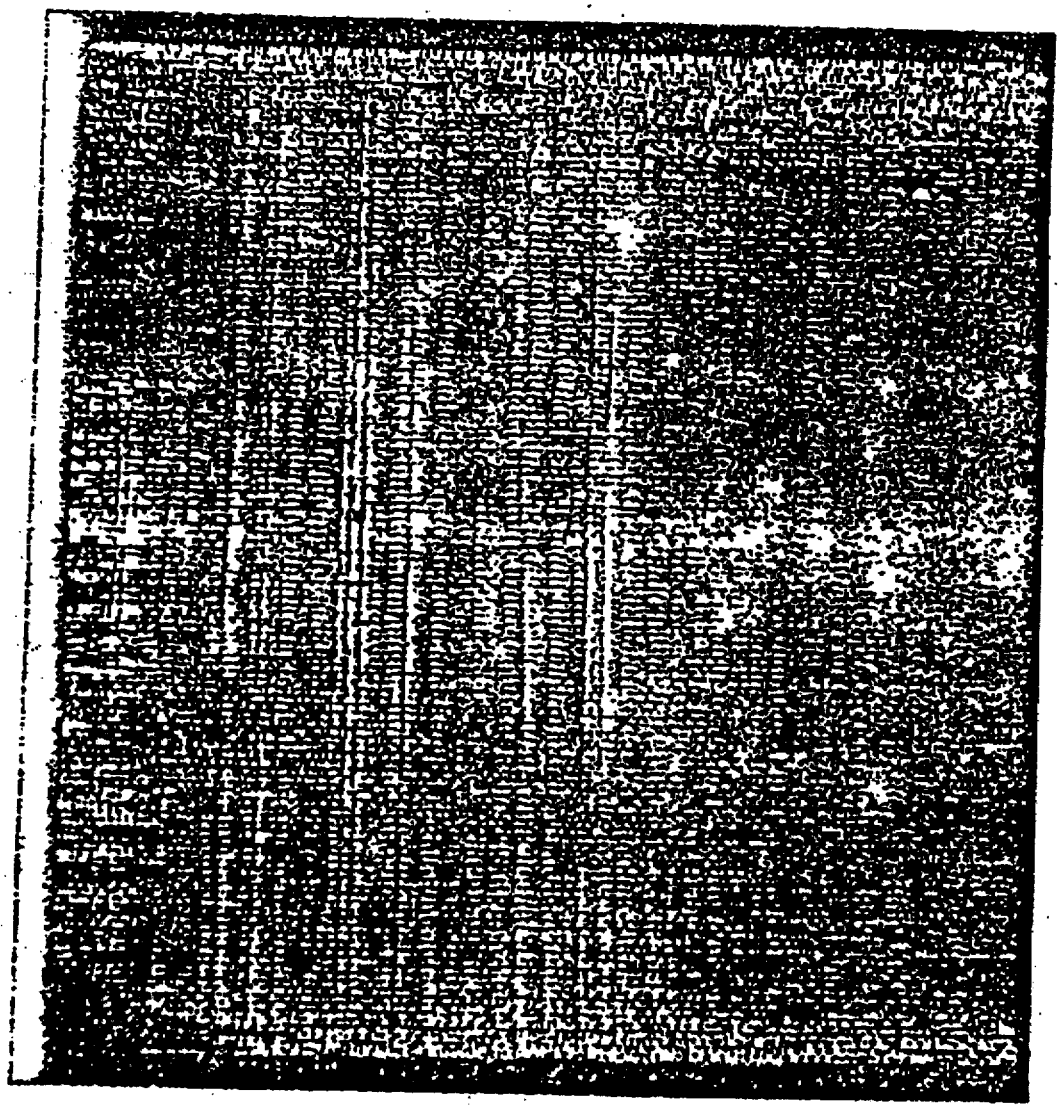
FIG. 4e is a photographic reproduction of the colored display formed by compositing the signals of FIGS. 4a through 4d above.

Filters 5, 6 and 7 separate the signal leaving the data processor into low, medium and high frequency components, respectively. The frequency bands of filters 5, 6 and 7 are, in this instance, started 5–30, 30–55, and 55–80 cycles per second (cps). Various other frequency ranges may be utilized depending upon the particular data being processed. The signal inputting to the filters 5, 6 and 7 in this particular instance, is shown as a photographic replica in FIG. 4a. The signal from the low-pass filter is shown schematically in FIG. 2.

Rectifier 8 is a computer which replaces the numerical value of the signal with the absolute value. This transition is shown schematically in FIG. 2 where the negative portions of signal b are converted into their absolute value in order to form signal c which is schematically representative of the signal emitted from the rectifier 8.

Figure 3:
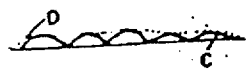
FIG. 3 is a representation of a portion of a rectified signal showing the envelope of the signal as it is formed by passing through a low-pass filter to complete the rectification-filtering which constitutes the demodulating process.

Low pass filter 9 is also a computer programmed to follow the peaks of the full wave rectified signal 6. This produces the "envelope" of signal 6 which is shown as d in schematic FIG. 3. This envelope represents the intensity of the signal in the low frequency band, averaged over a small, moving time window.

Converter 10 is a computer programmed to convert the amplitude of envelope signal d into a series of signals which cause short vertical excursions on the pen on plotter 11 which is a conventional digital plotter, e.g., the Calcomp plotter manufactured by California Computer Corporation, Anaheim, California.

Camera 12 is a conventional camera containing black and white negative film.

Printer 13 is a conventional photographic printer for example a ozalid diazo reproduction process printer capable of handling colored transparent materials.

Light 14 is a conventional source of light for viewing a finished composite transparent display.

2. Operation

In operation, shocks moving through earth 2 transmit a signal to geophones 1 which in turn emit electrical pulses to recorder 3 which digitizes and records on magnetic tape the signal from the geophones. The recorded signal from recorder 3 is then processed in data processor 4 which forms the various operations recited in connection with that unit under "Apparatus," above. The signal from data processor 4 is then sent to filters 5, 6 and 7 which convert it into the low-, medium-, and high-frequency component signals. The signal from data processor 4 is also sent to variable area plotter 15 which plots the signal in the form shown in FIG. 4a. Note that this variable area plotter fills in the area above and/or below the zero line. The output from the variable area plotter 15 is then sent to camera 16 which photographs the variable area plot and thereby produces a negative transparency (preferably black and white) which is utilized as the first element e of the finished component shown at the bottom of FIG. 1.

The output from filters 5, 6 and 7 are each treated similarly to each other, but for clarity, the individual processing of only the output from filter 5 will be traced herein.

The output from low-frequency filter 5 is full wave rectified in rectifying computer 8 and then sent to low pass filter 9 which extracts the "envelope" signal of the full wave rectified low-frequency filter output. The process of rectifying and low pass filtering is known as "demodulation" and is shown schematically in FIGS. 2 and 3 hereof in which signals b, c, and d represent the outputs from low-frequency filter 5, full wave rectifier 8, and low pass filter 9, respectively.

The demodulated low-frequency component signal is converted in convertor 10 into a signal which causes short vertical excursions of plotter 11. The frequency of these excursions is proportional to the amplitude of the envelope signal (shown schematically as "d" in FIG. 3).

Camera 12 then photographs the output of plotter 11 onto black and white negative film producing a transparent negative in which the lines of the output of plotter 11 appear clear on a black background. This black and white transparency from camera 12 is then printed on printer 13 on colored ozalid paper or on conventional photographic paper (both with transparent backing) to produce a transparent, colored replica of the output of plotter 11. This transparent positive replica of the low-frequency filtered component is then aligned in the composite shown at the bottom of FIG. 1 in which this particular transparency is depicted as "e′." The similarly processed (but differently colored) transparencies obtained from the medium-and high-frequency component signals, are also included in the composite and are shown in FIG. 1 as e′ and e″ respectively.

The transparencies are aligned and pressed together and a diffuser 20 is included to diffuse or slightly blend the colors of the individual components of the composite transparent display.

The transparent display is viewed by placing it against the diffused light source 14. Other methods such as those discussed herein under "Modifications" may be employed for viewing the finished composite display.

The final display permits simultaneous viewing of both the frequency distribution and the shape or "character" of the arriving seismic events. The colors indicative of the frequency distribution aid in correlating events from seismic trace to seismic trace depicted in the transparent display and for observing changes in frequency-dependent attenuation of earth-controlled waves or functions. Use of the demodulated signal or the depiction of the signal as excursions of relatively narrow lines permits a maximum amount of detailed information to be observed simultaneously. In short, by providing the simultaneous input of a maximum amount of detailed earth-controlled information to the observer, the present invention provides a powerful tool for geological interpretation of subsurface geologic conditions and formations.

3. Modifications of the Invention

It should be understood that the invention is capable of a variety of modifications and variations which will be made apparent to those skilled in the art by a reading of the specification and which are to be included within the spirit of the claims appended hereto. For example, the invention can use two or four or even more colors, depending upon the number of component signals to be combined in the finished display; the invention may make use of stereo techniques, e.g., spaced polarized projectors used in conjunction with polarized viewing glasses to depict additional variables, e.g., topographical elevation or a 3-dimensional, color stereographic projection in which a seismic section is displayed in the form of a colored 3 dimensional surface in which 1 dimension represents distance along the ground, the second represents time, and the third represents signal amplitude at a given point in space and time. The color of the surface portrays, in the preferred embodiment, the frequency components, averaged over a small, adjacent time window at the given point in space and time. Other outputs may be utilized, e.g., a three-gun cathode ray tube with each gun connected to a different frequency component; a multiple-exposure technique for color film, a multiple-projector technique for projecting transparencies or opaque representations of the component signals onto a single screen with a differently colored image for each component (with or without variable density filters on each of the projectors so as to balance the intensity of the various colors for optimum viewing); or conventional dye/transfer matrix techniques of photography may be employed. The invention may also be utilized with transients from full-wave form acoustic logs and various other newer geophysical survey, recording, processing and display techniques including laser scanning of transparencies of the component signals. In especially preferred modifications other suitable conventional filtering can be substituted to cause the color to represent continuously varying parameters other than frequency, e.g., color can represent velocity through the earth (averaged along some path) or some function thereof, such as velocity gradient. This same result can be alternatively accomplished with the unmodified apparatus of FIG. 1 by converting the selected parameter into frequency then proceeding as in the description of FIG. 1.

What is claimed is:

1. In a process for the display of earth-controlled events, the improvement comprising in combination:
   a. creating a substantially continuous or discretely sampled electrical signal indicative of said events over an interval of time,
   b. parallel filtering said electrical signal through at least one filter to separate said signal into a plurality of filtered signals, each representing the component of said signal in a particular band of a continuously varying parameter,
   c. converting each of said filtered signals into a series of visible lines having excursions, the frequency of said excursions being proportional to the amplitude of said filtered demodulated signal, and representing the intensity of the signal in a particular band of said parameter, averaged over a small, moving time window.
   d. producing a differently colored replica of each of said set of visible line excursions,
   e. combining the color replicas corresponding to each signal of said plurality of filtered signals to form a single display indicative of the parameter component distribution of said signal indicative of said earth-controlled events.

2. In a process for the display of earth-controlled transient events, the improvement comprising in combination:

a. creating a substantially continuous or discretely sampled electrical signal indicative of said events over an interval of time,
   b. parallel filtering said electrical signal through at least one filter to separate said signal into a plurality of filtered signals, each representing the component of said signal in a particular band of a continuously-varying parameter,
   c. demodulating each of said filtered signals to form a corresponding demodulated envelope signal, representing the intensity of the signal in a particular band of said parameter, averaged over a small, moving time window,
   d. producing a differently colored visible display of each of said demodulated envelope signals wherein the amount of color in a portion of said visible display is proportional to the amplitude of the corresponding portion of said demodulated signal,
   e. combining the colored displays corresponding to each of said filtered, demodulated envelope signals to form a single display indicative of the amplitude of each of said parameter components of said signal indicative of said earth-controlled event.

3. A process according to claim 1 additionally comprising:
   f. producing a visible display representative of said electrical signal indicative of said events,
   g. combining said display representative of said electrical signal indicative of said events with said single display indicative of the time variation in amplitude of each of said parameter components.

4. A process according to claim 2 additionally comprising:
   h. producing a visible display representative of said electrical signal indicative of said events,
   i. combining said display representative of said electrical signal indicative of said events with said single display indicative of the time varying amplitude of each of said parameter components.

5. A process according to claim 3 additionally comprising:
   b'. demodulating each of said filtered signals to form a corresponding demodulated signal.

6. The process of claim 1 wherein each of said visible lines is displayed as a colored transparent line and wherein said single display is produced by superimposing two or more sets of colored line displays in registry.

7. The process of claim 2 wherein each of said visible lines is displayed as a colored transparent line and wherein said single display is produced by superimposing two or more sets of colored lines, i.e., individual colored line displays, in registry.

8. The process of claim 3 wherein each of said visible lines is displayed as a colored transparent line and wherein said single display is produced by aligning said colored transparent lines.

9. The process of claim 4 wherein each of said visible lines is displayed as a colored transparent line and wherein said single display is produced by aligning said colored transparent lines.

10. The process of claim 5 wherein each of said visible lines is displayed as a colored transparent line and wherein said single display is produced by aligning said colored transparent lines.

11. A colored display produced according to claim 1.

12. A colored display produced according to claim 2.

13. A colored display produced according to claim 10.

14. The process of claim 1 in which said continuously varying parameter is frequency.

15. The process of claim 2 in which said continuously varying parameter is frequency.

16. The process of claim 1 in which said continuously varying parameter is velocity through the earth or some mathematical function dependent thereon.

17. The process of claim 2 in which said continuously varying parameter is velocity through the earth or some mathematical function dependent thereon.

* * * * *

UNITED STATES PATENT OFFICE
CERTIFICATE OF CORRECTION

Patent No. 3,781,785     Dated July 8, 1974

Inventor(s) Alfred H. Balch

It is certified that error appears in the above-identified patent and that said Letters Patent are hereby corrected as shown below:

| | |
|---|---|
| Claim 1, line 54: | Delete "filtered demodulated signal" and insert therefor --filtered signal--. |
| Claim 6, line 48: | After "registry" insert --, and wherein a corresponding set of original signal lines is similarly produced without filtering from said electrical signal indicative of said earth controlled events and is superimposed with said colored line displays.-- |
| Claim 7, line 53: | After "registry" insert --, and wherein a corresponding set of original signal lines is similarly produced without filtering from said electrical signal indicative of said earth controlled events and is superimposed with said colored line displays--. |
| Claim 18 (per 312 amend) | Add the following claim 18:<br>--The process of Claim 1 in which said continuously varying parameter is frequency or some mathematical function dependent thereon.--. |

Signed and sealed this 5th day of November 1974.

(SEAL)
Attest:

McCOY M. GIBSON JR.
Attesting Officer

C. MARSHALL DANN
Commissioner of Patents